June 28, 1960 W. E. CLAUS 2,942,487
VARIABLE SPEED FRICTION DISC TRANSMISSION
Filed April 29, 1959 3 Sheets-Sheet 1

Inventor
Walter E. Claus

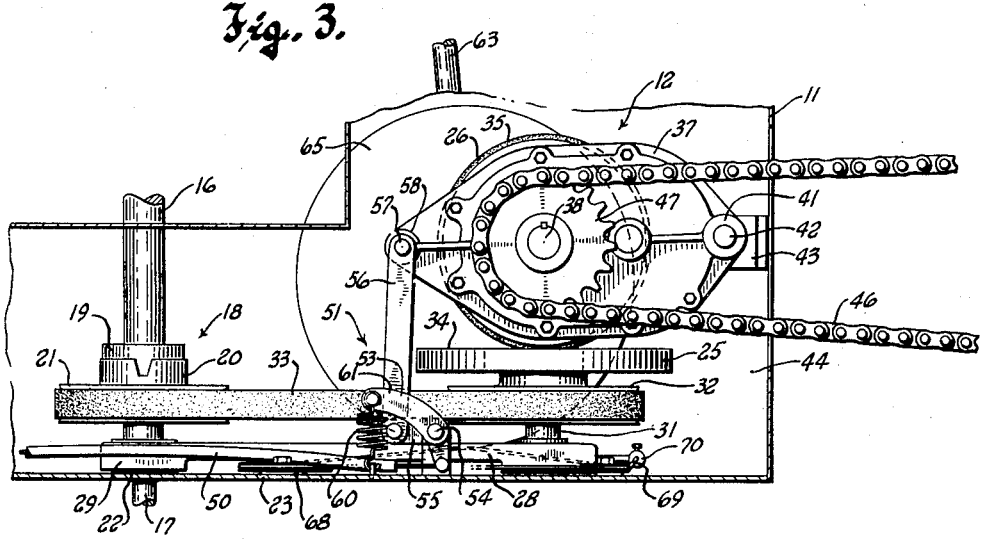
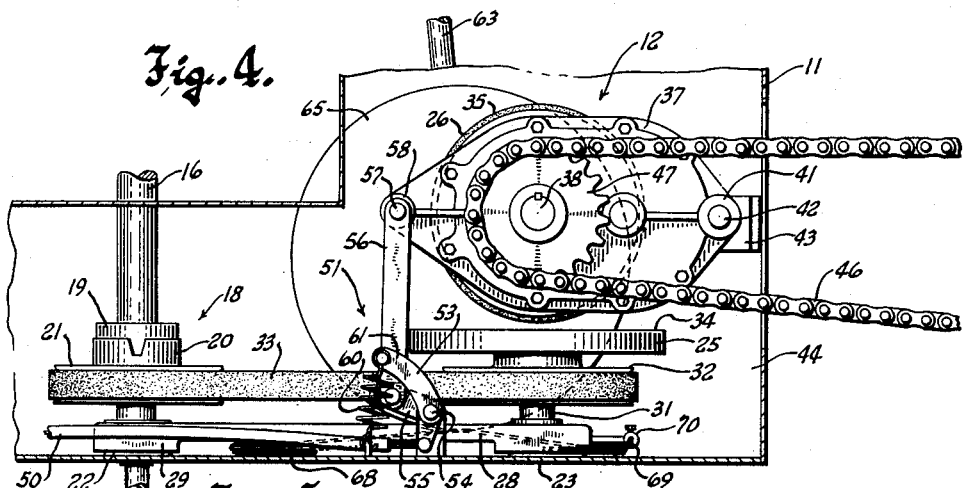
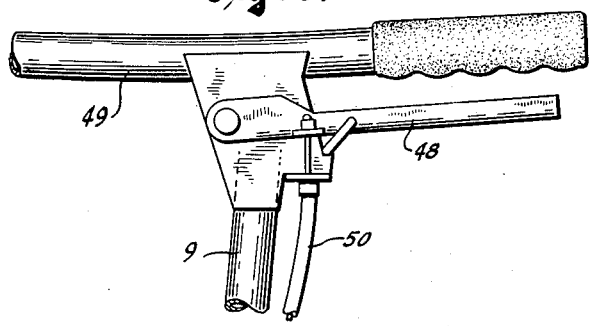

June 28, 1960 W. E. CLAUS 2,942,487
VARIABLE SPEED FRICTION DISC TRANSMISSION
Filed April 29, 1959 3 Sheets-Sheet 3

Inventor
Walter E. Claus
Attorney

United States Patent Office 2,942,487
Patented June 28, 1960

2,942,487
VARIABLE SPEED FRICTION DISC TRANSMISSION

Walter E. Claus, 4522 W. Ryan Road, Milwaukee, Wis.

Filed Apr. 29, 1959, Ser. No. 809,830

9 Claims. (Cl. 74—197)

This invention relates to friction disc transmissions generally, and has more particular reference to the provision of an improved friction disc transmission which is especially suitable for use on power lawn mowers.

While the principle of friction drive between a pair of cooperating discs, one having its periphery engaged with a face of the other is not new, it is an object of this invention to provide a friction disc transmission of the character described wherein change in the speed and direction of rotation imparted to the driven disc by the driving disc is accomplished in an especially simple and efficient manner.

In variable speed friction disc transmissions of the character described, either of the cooperating discs may comprise the driving disc. Thus, the driving disc may have a flat face which lies in a plane normal to its axis of rotation, while the driven disc may be constrained to rotate on an axis normal to the axis of the driving disc and have its periphery engaged with the face of the driving disc. In that case, the speed at which rotation is imparted to the driven disc, of course, is a function of the distance between the axis of the driving disc and the zone at which its face is engaged by the periphery of the driven disc. In other words, the driven disc is rotated slower by its engagement with the face of the driving disc as the driven disc is moved toward the axis of rotation of the driving disc, and its direction of rotation may be reversed upon movement thereof from one side to the other of the axis of rotation of the driving disc.

It is customary in friction disc transmissions of the character described to maintain the driven disc drivingly connected with the shaft upon which it is mounted by means of a splined connection therewith, so that the driven disc can be moved axially a distance corresponding to substantially the full diameter of the driving disc while retaining its driving relationship with the shaft to be driven. While a splined driving connection between the driven disc and its shaft may be satisfactory for many installations, it is especially objectionable for use on power lawn mowers by reason of the fact that the grease which must be present at all times on the spline to assure its operativeness is exposed to dust, grass clippings, leaf mulchings and a variety of other debris which can accumulate upon the spline and eventually cause malfunctioning of the transmission.

The provision of such a splined connection is also objectionable for use on power lawn mowers, in which low cost is usually an important consideration, by reason of the fact that it also requires complicated auxiliary mechanism such as yokes, levers, and the like to enable the driven disc to be manually shifted back and forth along its spline. Such auxiliary mechanism, of course, objectionably increases the cost of the transmission.

With these objections in mind, it is a purpose of this invention to provide a friction disc drive transmission of the character described in which both reversing and variation in speed along with declutching of the transmission are accomplished in an especially simple and inexpensive manner that obviates the need for splined driving connections between either of the cooperating discs and the shafts upon which they are mounted.

In this connection, it is a further purpose of the invention to provide a friction disc transmission of the character described featuring cooperating driving and driven discs that are edgewise bodily swingable relative to one another to accomplish reversing and variation in the speed of rotation imparted to the driven disc by the driving disc, along with declutching of the transmission.

More specifically it is an object of this invention to provide a friction disc drive transmission of the character described wherein the driving disc is constrained to swing bodily edgewise about an axis coincident with that of the power shaft from which it is driven, in a path generally lengthwise of the axis of rotation of the driven disc in order to effect change in the speed and direction of rotation imparted thereby to the driven disc. It is also a more specific object of this invention to mount the driven disc for bodily edgewise swinging motion in a path substantially normal to the face of the driving disc to enable its periphery to be carried into and out of engagement with the face of the driving disc so as to thereby effect clutching and declutching of the transmission.

A further object of this invention resides in the provision of a friction disc drive transmission which is especially suitable for use on riding type power lawn mowers, and wherein the driving disc and the driven disc are respectively drivingly connected with a power shaft and a wheel of the mower to be driven by means which is not in anywise affected by bodily edgewise shifting motion of either disc during clutching and declutching of the transmission or when varying the speed at which the driven disc rotates the wheel to be driven.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 3 is a sectional view taken through Figure 2 along the line 3—3, and showing the drive transmission in an operating condition;

Figure 4 is a sectional view similar to Figure 3 but showing the drive transmission in its declutched condition;

Figure 5 is an enlarged detail view of a portion of the handlebar of the mower showing the clutch control lever mounted thereon.

Figure 1:
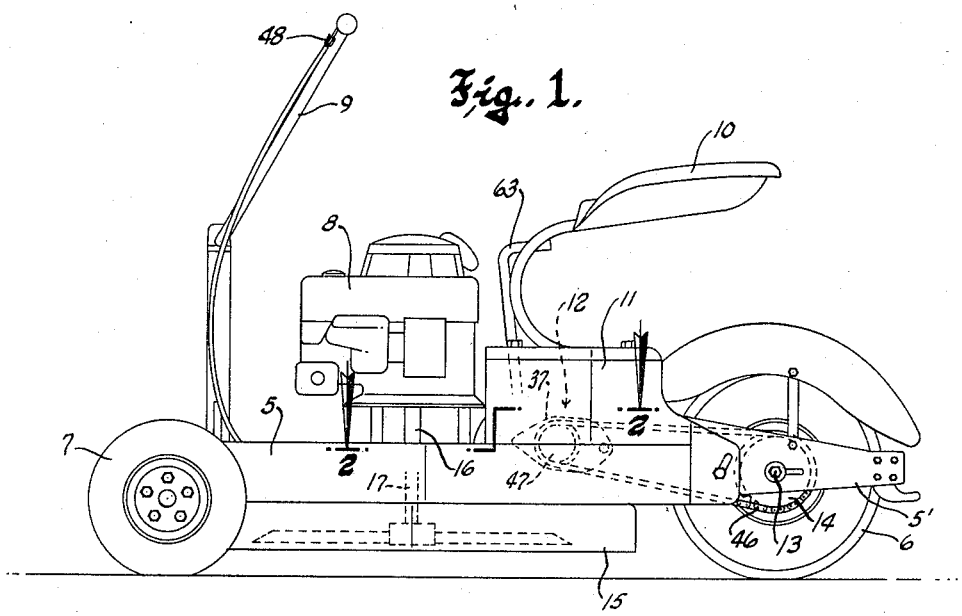
Figure 1 is a side elevational view of a power driven riding lawn mower equipped with the friction disc drive transmission of this invention.
Figure 2:
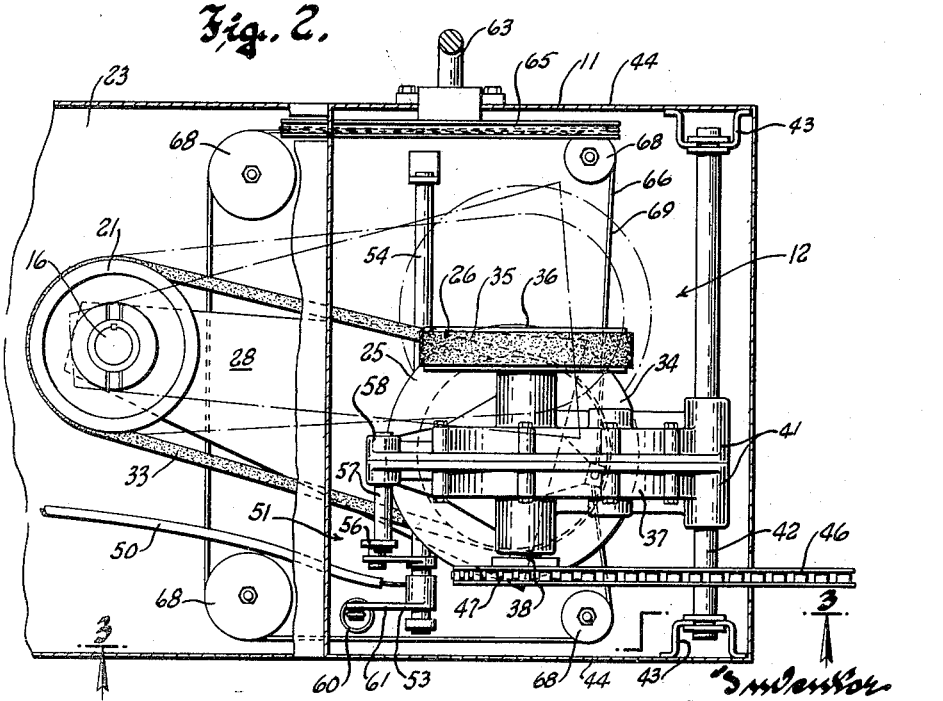
Figure 2 is a sectional view taken through Figure 1 along the line 2—2, but at an enlarged scale.

Referring now more particularly to the accompanying drawings, in which like reference characters have been applied to like parts throughout the several views, it should first be appreciated that mainly for purposes of illustration, the friction disc drive transmission of this invention has been shown incorporated in a small power driven riding lawn mower, for which it is ideally suited.

However, those skilled in the art will realize that it is capable of use in many other environments.

The riding mower shown comprises an elongated chassis 5 having rear and steerable front wheels 6 and 7, respectively, a prime mover in the form of a vertical shaft internal combustion engine 8 mounted on the chassis behind the front wheels and near a steering control member 9 by which the front wheels may be turned or steered. An operator's seat 10 is supported by an enclosure 11 which projects up from the chassis directly behind the engine and serves to house part of the friction disc drive transmission 12 of this invention.

In the present case the mower has only one rear wheel 6, which is rotatably mounted on an axle 13 having its ends spanning and secured in laterally opposite fork-like arms 5' that constitute a part of the chassis. The rear wheel 6 is the drive wheel of the mower, and it has a sprocket 14 fixed with respect to it, to enable it to be drivingly connected with the transmission 12 in a manner to be hereinafter described.

A rotary mower is mounted on the underside of the chassis 5, between the front and rear wheels, and it may be provided with any suitable type of blade means (not shown) that rotates in a horizontal plane within a housing 15 which provides a protective skirt extending around the blade orbit. The blades, of course, are drivingly connected with the downwardly extending engine shaft 16, either directly or through a coaxial downward extension 17 of the engine crankshaft.

To facilitate assembly, the shaft extension 17 is drivingly connected to the engine shaft 16 by means of a jaw clutch connection 18 consisting of a male clutch member 19 secured to the lower end of the engine shaft and at all times drivingly engaged with a femal jaw member 20 fixed to the shaft extension 17. The female jaw member 20 comprises the hub of a V-pulley 21 on the shaft extension 17, which pulley is constrained to rotate with the engine shaft 16 whenever the engine is in operation. The shaft extension 17 is constrained to rotate on a vertical axis coincident with the axis of the power shaft 16, being journaled in a suitable bearing 22 fixed in a wall 23 carried by and extending across the bottom of the chassis and under the housing 11 thereon.

The friction disc drive transmission 12 of this invention comprises cooperating drive and driven discs 25 and 26, respectively, the former being disposed to rotate about a vertical axis and the latter being disposed to rotate about a horizontal axis transversely of the chassis. The manner in which the cooperating drive and driven discs are mounted constitutes one of the main features of the invention. Not only does it result in the utmost simplicity, but it has the advantage of eliminating the need for costly splined connections such as were used heretofore in drive transmissions of this type.

In order to mount the driving disc 25, the transmission is provided with an arm 28 which is slidingly supported on the bottom wall 23 of the chassis. At one end portion, the arm has a hub 29 through which the shaft extension 17 projects to constrain the arm to swinging motion directly over the wall 23, about a vertical axis coincident with the axis of the power shaft 16. The arm extends rearwardly from the shaft and has a vertical stub shaft 31 fixed in its rear portion. The stub shaft extends only a short distance above the arm and has the driving disc 25 freely rotatably mounted on its upper end portion. As shown, the disc may be formed integrally with the hub of a driven V-pulley 32 which aligns horizontally with the drive pulley 21 on the power shaft, so that a V-belt 33 encircling the pulleys drivingly connects the power shaft and the driving disc 25.

It is important to note that the tension in the V-belt 33 is maintained constant at all times by reason of the fact that the arm 28 swings horizontally from side to side, to carry the driving disc edgewise therewith, about the axis of the drive pulley.

The driven disc 26 is disposed edgewise with respect to the upper face 34 of the driving disc, and the periphery of the driven disc preferably consists of a tire 35 of material having good frictional characteristics such as rubber vulcanized to the edge of the disc.

The driven disc 26 is fixed to the power input shaft 36 of a gear case 37 having speed reducing gearing therein (not shown), the shaft being rotatable on a horizontal axis which is located above the driving disc 25 and is coincident with that of the power output shaft 38 of the gear case. Although the shafts 36 and 38 are coaxially mounted in suitable bearings on the gear case housing, these two shafts are separate from one another and connected through idler gearing (not shown) inside the gear case.

According to this invention, the entire gear case is supported for up and down swinging motion to carry the driven disc 26 edgewise toward and from engagement with the face 34 of the driving disc 25. For this purpose the gear case has coaxially bored bosses 41 on its rear which receive a horizontal supporting shaft 42 extending across the housing 11 to have its ends mounted in suitable supports 43 on the opposite upright side walls 44 of the housing. The axis of the cross shaft 42 is disposed intermediate the axes of rotation of the driven disc 26 and the rear wheel 6 of the chassis, and it is so located with respect thereto that it lies close to or in the plane containing the axes of the wheel 6 and the driven disc.

When the gear case is swung downwardly about its support shaft 42, the periphery of the driven disc 26 is carried into frictional engagement with the face 34 of the driving disc to provide a rotation transmitting connection between the discs, by which rotation of the power shaft 16 is translated into rotation of the driven disc and thence to the power output shaft 38 of the transmission. Such rotation of the power output shaft 38 is transmitted to the rear wheel 6 by means of a chain 46 trained about its sprocket 14 and a cooperating sprocket 47 on the power output shaft.

Note that inasmuch as the gear case is constrained to swing about a horizontal axis substantially in alignment with the axis of the driven disc and that of the rear wheel 6, the up and down swinging motion of the gear case necessary to effect engagement and disengagement of the driven disc with respect to the upper face of the driving disc may take place without in anywise altering the tension on the chain 46.

Upward swinging motion of the gear case 37, of course, provides a convenient means of declutching the transmission, and the clutching and declutching motion of the gear case may be easily effected by the operator upon actuation of an operating lever 48 mounted on the outer end of one of the handle bars 49 at the upper end of the steering control member 9. This lever is connected with the gear case through a flexible control cable 50, and a lever-link system 51 shown best in Figure 6. As therein seen, the end of the flexible cable remote from the handle bar is secured as at 52 to the lower end of a bell crank lever 53, which is fixed to a rock shaft 54 that extends transversely across the chassis. The rock shaft 54 is supported at its ends in bearing standards that rotatably mount the shaft on the bottom wall 23 in a position beneath and forwardly of the drive disc-pulley assembly, but over the arm 28 that carries the drive disc. A lever arm 55 also fixed to the rock shaft connects with the lower end of an upright link 56 having its upper end connected by means of a pin 57 with a boss 58 on the forward end of the gear case.

Figure 6:
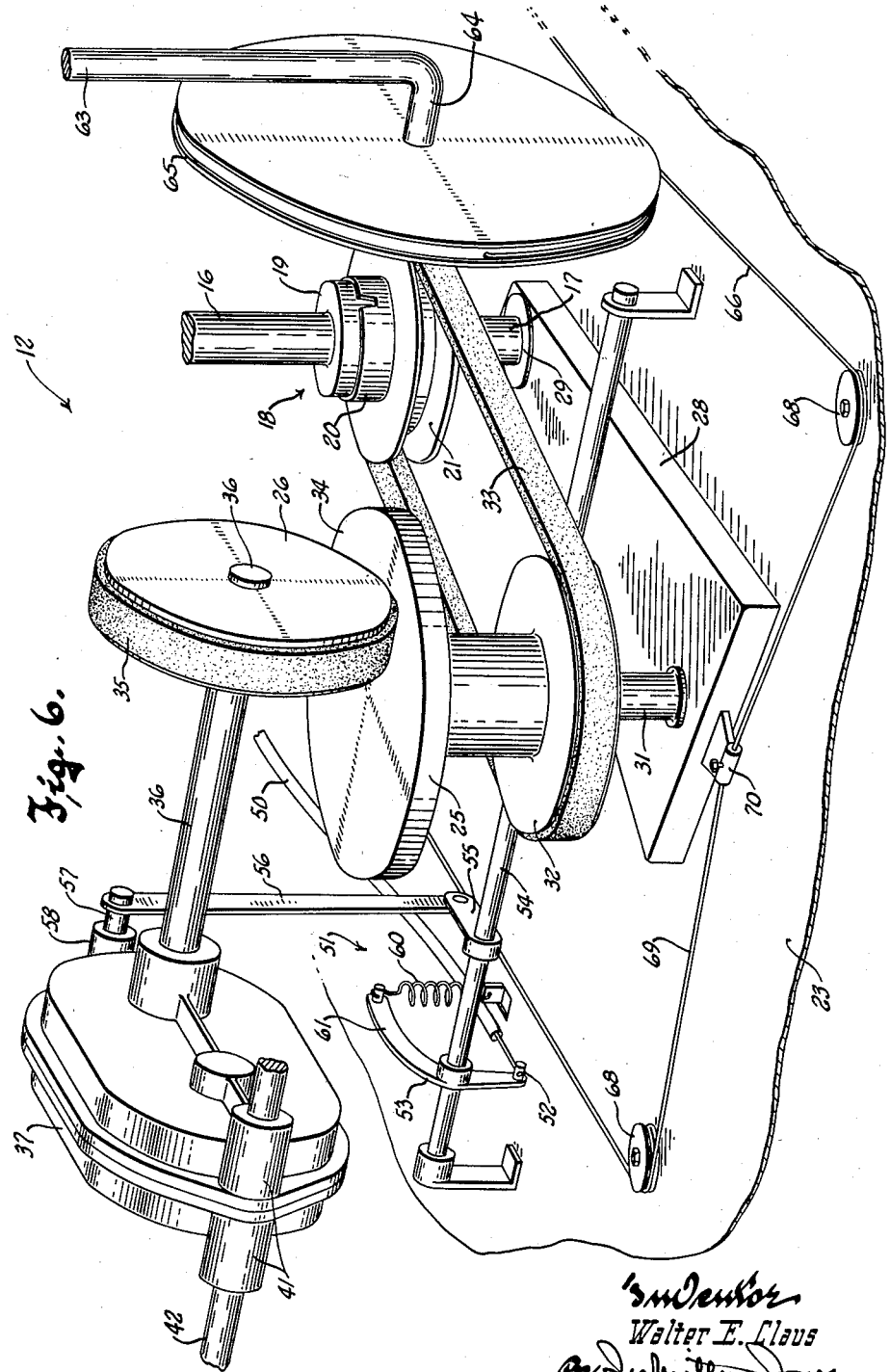
Figure 6 is a somewhat diagrammatic perspective view of the friction disc drive transmission of this invention.

As seen in Figure 6, therefore, clockwise oscillatory motion of the rock shaft 54 is translated into a downward pull on the forward end portion of the gear case to operatively engage the periphery of the driven disc 26 with the upper face of the driving disc, thus establishing the driving connection between the discs. A tension spring 60 connected to the bottom wall 23 of the chassis and to the outer end of the upper arm 61 of the bell crank lever 52 yieldingly holds the rock shaft 54 swung in the clockwise direction. The spring, therefore, tends at all times to maintain the driven disc 26 engaged with the face of the driving disc with the proper tension.

However, actuation of the hand lever 48 by the operator to swing the rock shaft 54 in a counterclockwise direction as seen in Figure 6, against the tension of the spring 60, tilts the gear case upwardly about the axis of its support shaft 42 to disengage the periphery of the driven disc 26 from the driving disc, thus declutching the transmission.

As in all friction disc drive transmissions of the type herein concerned, the distance between the axis of the driving disc and the zone at which its face is engaged by the periphery of the driven disc is a function of the speed at which the latter is driven. According to this invention, however, the speed at which the disc 26 is driven is controlled by shifting the driving disc edgewise back and forth, to the right or to the left as seen in Figure 6, about the axis of the power shaft 16. With the relative positions of the drive and driven discs therein seen, the transmission is in forward drive, but the drive to the rear wheel may be easily reversed by swinging the drive disc bodily to the right far enough to dispose the drive and driven discs in such relative positions that the driven disc engages the face of the drive disc at the opposite side of the axis of rotation of the drive disc from that shown.

It will also be seen that bodily swinging motion of the driving disc to alter the speed at which the driven disc is rotated thereby constrains the driving disc to travel along a path which is generally lengthwise of the axis of rotation of the driven disc. It should also be noted that the driven disc is moved bodily edgewise as a consequence of tilting the gear case about the axis of its support shaft 42 whenever the transmission is clutched or declutched.

The mounting of both the driving and the driven disc for edgewise bodily motion in the manner described completely eliminates the need for long and costly splined connections such as were employed in the past to enable axial shifting of one of the discs in speed changing and reverse drive directions with respect to the other disc.

In the present case, the speed may be varied or the direction of drive to the rear wheel reversed merely by actuation of a speed control lever or handle 63 projecting upwardly from one side of the chassis near the driver's seat 10. The handle 63 has an inwardly extending horizontal trunnion portion 64 on its lower end suitably rotatably journaled in the adjacent side wall 44 of the housing 11 and carrying a drum 65 at a location inside the housing. The periphery of the drum is grooved to receive a flexible cable 66 having its opposite ends fixed to the drum. The cable extends both forwardly and rearwardly from the drum to pass around the peripheries of two pairs of idler pulleys 68 mounted upon the bottom wall 23 of the chassis for rotation about vertical axes. One such pair of pulleys 68 is located at one side of the arm 28 carrying the driving disc and the other pair is located at the opposite side of the arm. These pulleys, of course, are so disposed that a rear stretch 69 of the cable passes behind the outer end of the arm 28 where it is secured thereto as at 70.

Consequently, when the speed control lever 63 is in a forward position such as shown in Figure 6, it effects forward drive to the rear wheel 6 of the lawn mowing unit at a substantially intermediate speed. If the lever is swung rearwardly with relation to Figures 3 and 4, however, it swings the arm 28 to the right as seen in Figure 6 to carry the driving disc to a reverse drive position at which the periphery of the driven disc engages its face at the opposite side of its axis of rotation.

From the foregoing description taken together with the accompanying drawings it will be readily apparent to those skilled in the art that this invention provides an improved friction disc transmission which, though of general utility, is especially advantageous for use on small power driven lawn mowing devices and the like wherein dust, grass clippings and other debris have little or no effect upon the transmission.

What is claimed as my invention is:

1. A drive transmission of the type wherein rotation is imparted from a drive disc to a driven disc as a consequence of frictional engagement between the periphery of one disc and a face of the other disc, said transmission being characterized by: the provision of means mounting said other disc for edgewise bodily swinging movement in opposite directions along a path parallel to said face thereof and about an axis parallel to its axis of rotation to enable the speed and direction of rotation imparted to the driven disc to be changed; and by the provision of means mounting said one disc for edgewise bodily swinging movement in opposite directions about an axis parallel to its axis of rotation, toward and from an operative position at which its periphery is frictionally engaged with the face of said other disc.

2. A drive transmission of the type wherein rotation is imparted to a driven disc by a rotatable driving disc having a face which is frictionally engaged by the periphery of the driven disc, said transmission being characterized by: the provision of means mounting the driving disc for bodily motion in opposite directions along a path parallel to said face thereof and substantially lengthwise of the axis of the driven disc to provide for change in the speed and direction of rotation imparted to the driven disc as a consequence of relative positioning of the discs with the driven disc located different distances to one side or the other of the axis of rotation of the driving disc; the provision of means mounting the driven disc for edgewise bodily movement toward and from engagement with said face of the driving disc; and by the fact that the driving disc is mounted for edgewise bodily swinging movement in opposite directions about an axis spaced from but parallel to the axis of rotation of the driving disc.

3. The drive transmission of claim 2, further characterized by the fact that the driving disc is driven from a power shaft which is constrained to rotate on an axis that is coincident with the axis about which the driving disc swings.

4. The drive transmission of claim 3, further characterized by the provision of: driving and driven members respectively constrained to rotate with the power shaft and the driving disc; and an endless transmission member encircling and drivingly connecting said driving and driven members to transmit rotation to the driving disc from the power shaft without interfering with bodily swinging movement of the driving disc about the axis of the power shaft and without altering the tension on the endless transmission member.

5. Means for transmitting driving torque from a power shaft to a rotatable member to be driven, comprising: rotatable first and second discs, the first disc having a face that is substantially normal to its axis of rotation and which is frictionally engageable with the periphery of the second disc to enable the discs to be drivingly connected with one another; means mounting each of said discs for edgewise bodily swinging movement in opposite directions relative to the other disc, about axes disposed crosswise of one another and each parallel to the axis of rotation of its disc, so as to provide for edgewise movement of said second disc toward and from an operative position at which its periphery is engaged with the face of the first disc, and so as to provide for edgewise movement of the first disc to a number of positions at which areas of its face spaced different distances to one side or the other of its axis of rotation are engaged by the periphery of the second disc; means drivingly connecting the power shaft with one of said discs without interfering with edgewise swinging movement of said last named disc; and means drivingly connecting the other of said discs with the rotatable member to be driven without interfering with edgewise swinging movement of said last named disc.

6. Means for transmitting driving torque from a power shaft to a rotatable member to be driven, comprising: rotatable first and second discs, the first disc having a face that is substantially normal to its axis of rotation and which is frictionally engageable with the periphery of the second disc to enable the discs to be drivingly connected with one another; means mounting each of said discs for edgewise bodily swinging movement in opposite directions relative to the other disc, about axes disposed crosswise of one another, with said first disc constrained to swing edgewise about the axis of the power shaft and along a path disposed substantially lengthwise of the axis of rotation of said second disc, so as to provide for edgewise movement of said second disc toward and from an operative position at which its periphery is engaged with the face of the first disc, and so as to provide for edgewise movement of the first disc to a number of positions at which areas of its face spaced different distances to one side or the other of its axis of rotation are engaged by the periphery of the second disc; an endless flexible member drivingly connecting the power shaft with said first disc and enabling the latter to be swung edgewise about the axis of the power shaft without interference from or altering the tension on said endless flexible member; and means drivingly connecting said second disc with the rotatable member to be driven without interfering with edgewise swinging movement of said second disc.

7. Means for transmitting driving torque from a power shaft to a rotatable member to be driven, comprising: rotatable first and second discs, the first disc having a face that is substantially normal to its axis of rotation and which is frictionally engageable with the periphery of the second disc to enable the discs to be drivingly connected with one another; speed reducing means including a gear case constrained to swing in opposite directions about an axis which is parallel to the axis of rotation of said second disc, said speed reducing means including speed reducing mechanism within the gear case, an input shaft carried by the gear case for rotation on an axis parallel to the axis about which the gear case swings and having said second disc mounted thereon for rotation therewith, an output shaft which is drivingly connected with said second disc, and means drivingly connecting said second disc with the rotatable member to be driven through said output shaft without interfering with swinging motion of the gear case to carry said second disc edgewise toward and from an operative position at which its periphery engages the face of the first disc; manually actuatable means connected with the gear case for swinging the same bodily in opposite directions so as to thereby effect edgewise movement of said second disc toward and from its operative position; means mounting said first disc for edgewise bodily swinging movement in opposite directions about an axis disposed crosswise of the axis of bodily swinging motion of said second disc so as to provide for edgewise movement of said first disc to a number of positions at which areas of its face spaced different distances to one side or the other of its axis of rotation are engaged by the periphery of the second disc; and means drivingly connecting the power shaft with said first disc without interfering with edgewise swinging movement of said first disc.

8. The torque transmitting means of claim 6, wherein another endless flexible member drivingly connects said second disc with the rotatable member to be driven, and wherein said second disc is constrained to rotate about an axis which is parallel to that of the member to be driven, and is constrained to swing bodily about an axis parallel to its axis of rotation and substantially lying in the plane containing the axes of rotation of the second disc and the member to be driven, so that the second disc may be swung bodily in opposite directions substantially without altering the tension on said other flexible member.

9. The torque transmitting means of claim 7, wherein endless flexible members drivingly connect the power shaft with said first disc, and drivingly connect the power output shaft with the rotatable member to be driven; wherein said first disc is constrained to edgewise swinging motion about the axis of the power shaft; and wherein the axis about which the gear case and said second disc swing is disposed intermediate the axes of rotation of said second disc and the member to be rotated.

References Cited in the file of this patent

UNITED STATES PATENTS

| | | |
|---|---|---|
| 1,297,485 | McKaig | Mar. 18, 1919 |
| 2,626,002 | Wubbe | Jan. 20, 1953 |